United States Patent Office 3,842,024
Patented Oct. 15, 1974

3,842,024
POLYEPOXYETHER AND BITUMEN
COMPOSITIONS
Jean Philippe Rieux, Decines, and Jean Lehureau, Lyon,
France, assignors to Rhone-Progil, Courbevoie, France
No Drawing. Filed June 7, 1971, Ser. No. 150,743
Claims priority, application France, June 5, 1970,
7020658
Int. Cl. C08g 30/02, 51/52
U.S. Cl. 260—28
8 Claims

ABSTRACT OF THE DISCLOSURE

A composition for use as a bonding, covering, or coating agent, comprising a mixture of bitumen, a polyepoxyether reagent derived from the reaction of a diepoxy combined with polyol, and a hardener for acting on the polyepoxyether to form a poly-addition resin.

---

The present invention relates to a new composition constituted by a mixture of polyepoxyether bitumen and a hardening agent, its method of manufacture, and its applications in the field of water-proofing, or material for roads.

It is known that for certain applications, it is advantageous to use a mixture of bitumen and epoxy resins, this is in particular for techniques requiring high performances, such as water-tight covers on works of art, the manufacture of materials for roofing or jointing or for the manufacture of road coatings for sections of roadway.

In practice, the epoxy bitumen mixtures produced contain a relatively low proportion of bitumen of the order of 15 to 20% by weight of the total, due to a limited compatibility between the two components. This mixture is not satisfactory from an economic viewpoint. However, with certain compositions based on diphenylol propane diepoxide containing 15% by weight bitumen (limit of compatibility) it is possible to obtain good mechanical properties but which are however, inferior to the compositions of the present invention used in the same proportions.

In addition, there exist resins of more complex structure, such as polyglycidic esters of polymerised linoleic acid, which have good compatibility with the bitumen. The composition thus obtained, has compared with diphenylol propane diepoxide, quite poor mechanical properties, as regards its tensile strength and is also expensive.

Generally, the known systems are not satisfactory, either from an economic viewpoint or as regards the properties of the system.

Attempts have been made to increase the threshold of compatibility between the two types of product. British Patent 996,499 of June 12th, 1962 recommends the addition of a compound with a solvent and diluent action which thus facilitates compatibility. The bitumen content of the mixture may be increased to much greater than 50% by weight, but this result is obtained to the detriment of the mechanical properties of the final, hardened product.

In the prior art known hitherto, it appears that an increase of the threshold of compatibility either by means of a combining solvent, or by means of the more complex system such as the polyglycidic ester of polymensed linoleic acid and the relative retention of the mechanical properties, are not reconcilable.

An object of the present invention is to obviate or mitigate the above disadvantage and to provide a hard-enable mixture of bitumen with a particular type of epoxy resin, with a high content of bitumen presenting, after hardening, clearly improved characteristics relative to the known systems, glycidic linoleic ester and combining solvent.

The present invention relates to a mixture of bitumen, a polyepoxyether reagent and a hardener, in the absence of a solvent or thinner, the bitumen content of which may be greater than 50% by weight, characterised by the fact that the polyoxyether reagent is derived from the reaction of $(n+1)$ molecules of a diepoxy compound with $n$ molecules of polyol, this polyepoxyether being then subjected to the action of the hardener in order to form a polyaddition resin.

The diepoxy compound is derived from the condensation of a diphenol with an epihalohydrin. The subsequent addition reaction produces a polyepoxyether having reactive epoxy groups at the end of the chain; according to the following formula:

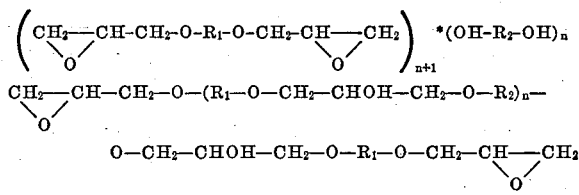

$R_1$ is the remainder of a diphenol
$R_2$ is the remainder of a polyol

The mixture of bitumen, polyepoxyether and hardener formed without an additive which is capable of acting as a solvent, makes it possible to obtain a better compatibility, even for bitumen contents greater than 50% by weight.

According to the properties required in practice, the bitumen content may vary from 10 to 50% by weight.

The present invention makes it possible not only to increase the threshold of compatibility between the bitumen and the polyepoxyether reagent and consequently to reduce the cost price, but in addition substantially improves the mechanical properties of the mixture after hardening, relative to other known systems, which is a very advantageous result in the subsequent applications.

The bitumens used in the framework of the present invention may be road bitumens constituted by asphaltenes coated with maltenes with a penetrability index of 20 to 300.

The polyepoxyether results from the reaction of a diepoxy compound with a polyol. This diepoxy compound is itself obtained by condensation of a diphenol such as diphenylolpropane, hydrogenated or substituted diphenylolpropane or resorcinol, with an epihalohydrin, such as epichlorhydrin. This diepoxy compound reacts with or without a catalyst and with or without an auxiliary solvent, at about 150–160°° C. with a polyol which may be ethylene glycol, diethylene glycol, butanediol, pentane diol, hexanediol, octanediol, or even polyethylene glycol. The diepoxy compounds used may be pure products rectified under vacuum or crude condensation products, characterised by an epoxidic oxygen of between 50 and 100% of the theoretical value.

The hardener used for allowing the formation of the resin from the polyepoxyether reagent may be an amine, an amino amide, an amido amine of polymerised linoleic acid or a hydrolysable imine. The choice of hardener makes it possible to adapt the quality of the finished product to the application envisaged.

There can be added to the composition of the present invention various well-known additives, such as surface-active agents, adhesives, fluidising reagents or not of the polyaddition catalysts activated fillers or not of any other additive or filler facilitating the use or improving the performance of the final mixture. There may also be added, in order to facilitate this use, as a variation, a solvent causing an increase in compatibility, lowering the mechanical properties, which, however, remain adequate for the requirements.

One advantageous characteristic of the compositions according to the present invention, resides in their non toxicity; experiments with guinea-pigs have brought this particular aspect to light.

There will now be described, as a non-limiting example, certain embodiments of the invention.

The following polyepoxyether reagents were produced by reaction at 155° C. of a diepoxy compound with a polyol.

| Polyepoxyethers | Diepoxy compound | Polyol |
|---|---|---|
| Number: | | |
| 1 | Diphenylol propane diepoxide. | Ethylene glycol. |
| 2 | do | Diethylene glycol. |
| 3 | do | Octane diol 1–8. |
| 4 | Resorcinol diepoxide | Diethylene glycol. |
| 5 | do | Hexane diol 1–6. |
| 6 | do | Neopentyl glycol. |

The above mentioned polyepoxy ether reagents are thus mixed at 80° C. with stirring with a bitumen with a penetrability index of 180–220.

The compatibility is evaluated as a tendency of the mixtures to remain stable, without showing any signs of separating.

There is then added to the mixtures a certain quantity by weight of the hardener which is an amidoamine known under the trade name Versamid 140. Specifically Versamid 140 is an amidoamine produced by reacting one mole of a dimer of linoleic acid with two moles of triethylenetetramine and is sold by Schering.

The mixture is then poured at 70° C. The plates obtained are removed from the moulds after 48 hrs. and then cured for 2 days at 50° C. and for one day at 20° C. Tests for tensile strength are then carried out.

The following table gives all the results of the mechanical measurements taken with a dynamometer at 20° C.

| Polyepoxy ether | Percent by weight | | | Compatibility | Elongation at ruptur, percent | Tensile strength, kg./cm.² |
|---|---|---|---|---|---|---|
| | Polyepoxy ether | Bitumen | Hardener | | | |
| 1 | 36 | 45 | 19 | Compatible | 5 | 140 |
| 2 | 59 | 15 | 26 | do | 5 | 450 |
| 2 | 49 | 30 | 21 | do | 6 | 340 |
| 2 | 34 | 50 | 16 | do | 10 | 110 |
| 3 | 59 | 15 | 26 | do | 5 | 340 |
| 3 | 49 | 30 | 21 | do | 4 | 220 |
| 3 | 34 | 40 | 26 | do | 6 | 160 |
| 4 | 49 | 15 | 36 | do | 60 | 240 |
| 4 | 40 | 30 | 30 | do | 62 | 185 |
| 4 | 30 | 50 | 20 | do | 72 | 90 |
| 5 | 50 | 15 | 35 | do | 7 | 345 |
| 5 | 41 | 30 | 29 | do | 5.5 | 230 |
| 5 | 29 | 50 | 21 | do | 4.5 | 120 |
| 6 | 50 | 15 | 35 | do | 7 | 435 |
| 6 | 41 | 30 | 29 | do | 4 | 325 |
| 6 | 32 | 45 | 23 | do | 2 | 170 |

The hardener used was Versamid 140 of Schering.

As a comparison, a table will now be given of the results obtained with diepoxy compounds different from those of the invention.

Examples will now be given, in a non-limiting manner, which use a non-reactive thinner (diluent).

The compositions contain 60% by weight of bitumen 180/220 and 7% polyethylene glycol non-reactive diluent.

| Diepoxy compound | Percent by weight | Hardener, percent by weight | Elongation at rupture | Tensile strength, kg./cm.² |
|---|---|---|---|---|
| Polyepoxyether: | | | | |
| No. 2 | 23 | 10 | 100 | 95 |
| No. 3 | 23 | 10 | 80 | 120 |
| No. 4 | 19 | 14 | 200 | 85 |
| No. 5 | 19.5 | 13.5 | >200 | 45 |
| No. 6 | 19 | 14 | 40 | 60 |
| Glycidic ester of polymerised linoleic acid | 26 | 7 | 80 | 5 |

Practical examples for carrying out the invention will now be described.

Example 1

To a mixture of 34 g. of polyepoxyether No. 2 and 50 g. of 180/220 bitumen and 16 g. of Versamid 140, there are added 750 g. sand and this is all mixed well. The composition is spread in the form of a layer on a concrete slab and left to harden at ambient temperature. The final layer is tough and flexible, shock-resistant and has a good inertness to solvents.

Example 2

The mixture of Example 1 is used, polyepoxyether, bitumen, Versamid 140, without any addition of sand, for stopping up the cracks of a cement concrete. The cracks are cleaned, and the mixture is poured in. After several hours, a seal with excellent adhesion is obtained.

Example 3

The polyepoxyether bitumen binder and hardener is applied to a metallic support, previously covered with sand. This support is subjected to variations in temperature and to weathering and the support shows no trace of rust after the binder has been removed.

What we claim is:

1. A solvent-free hardened composition consisting essentially of:

(1) 10–50 percent by weight, based on the weight of the composition, of bitumen having a penetrability index of from 20 to 300;

| Diepoxy compound | Percent by weight | | | Compatibility | Elongation at rupture, percent | Tensile strength, kg./cm.² |
|---|---|---|---|---|---|---|
| | This compound | Bitumen | Hardener | | | |
| Diphenylol | 42.5 | 15 | 42.5 | Compatible | 1 | 250 |
| Propane diepoxide with 8.6% epoxy oxygen | 40 | 20 | 40 | Incompatible | | |
| Polyglycidic ester of polymerised linoleic acid | 62 | 15 | 23 | Compatible | 24 | 17 |
| | 54 | 30 | 16 | do | 30 | 15 |
| | 39 | 50 | 11 | do | 50 | 10 |

These various examples illustrate the mediocre performances of the systems not within the scope of the invention. The mechanical characteristics are always less than those of the systems claimed in the standard region of compatibility.

(2) 29 to 59 percent by weight, based on the weight of the composition, of a polyepoxyether having reactive epoxy end groups consisting of the condensation product of $(n+1)$ moles of a diepoxy compound with $n$ moles of a polyol, said diepoxy compound being a condensation product of a diphenol with an epihalohydrin and having an epoxidic oxygen content of from 50 to 100 percent of the theoretical value; and (3) 16 to 32 percent by weight, based on the weight of the composition, of a hardener capable of hardening the composition selected from the group consisting of amines, aminoamides, an amidoamine of polymerized linoleic acid and a hydrolysable imine.

2. The hardened composition of claim 1 wherein said diepoxy compound is the condensation product of epihalohydrin with a diphenol selected from the group consisting of diphenylolpropane, hydrogenated diphenylolpropane, a substituted diphenylolpropane and resorcinol; and wherein said polyol is selected from the group consisting of ethylene glycol, diethylene glycol, butanediol, pentanediol, hexanediol, octanediol and polyethylene glycol.

3. The hardened composition of claim 1 wherein said bitumen is a road bitumen having a penetrability index of from 180 to 220.

4. A method for preparing the hardened composition of claim 11 wherein the components are mixed when warm.

5. The hardened composition of claim 1 further consisting essentially of a non-reactive diluent.

6. The hardened composition of claim 5 consisting essentially of, in percentages by weight based by the weight of the composition, about 60 weight percent bitumen, about 7 weight percent of a diluent comprising polyethylene glycol, from 10 to 14 weight percent of said hardener and from 19 to 23 weight percent of said polyepoxyether.

7. The hardened composition of claim 2 wherein said condensation reaction between said diepoxy compound and said polyol is conducted at a temperature of from 150 to 160° C.

8. The hardened composition of claim 7 wherein said condensation reaction is conducted in the presence of a catalyst and a solvent.

References Cited
UNITED STATES PATENTS

| | | | |
|---|---|---|---|
| 3,379,791 | 4/1968 | Larsen et al. | 260—47 EP |
| 3,409,572 | 11/1968 | Neal et al. | 260—28 |
| 3,420,794 | 1/1969 | May et al. | 260—28 |
| 3,514,418 | 5/1970 | Schwarzer | 260—28 |

OTHER REFERENCES

Lee & Neile, Handbook of Epoxy Resins, McGraw-Hill Publishing Co., pages 15–16–15–18 relied upon.

ALLAN LIEBERMAN, Primary Examiner

S. C. FOX, Assistant Examiner

U.S. Cl. X.R.

260—47 EP